Nov. 3, 1953 W. A. DEPP 2,658,166

MULTICATHODE GLOW DISCHARGE DEVICE

Filed Dec. 15, 1951 2 Sheets-Sheet 1

INVENTOR
W. A. DEPP
BY [signature]
ATTORNEY

MULTICATHODE GLOW DISCHARGE DEVICE

Filed Dec. 15, 1951 2 Sheets-Sheet 2

INVENTOR
W. A. DEPP
BY
ATTORNEY

Patented Nov. 3, 1953 2,658,166

UNITED STATES PATENT OFFICE 2,658,166

MULTICATHODE GLOW DISCHARGE DEVICE

Wallace A. Depp, Mountainside, N. J., assignor to Bell Telephone Laboratories, Incorporated, New York, N. Y., a corporation of New York Application December 15, 1951, Serial No. 261,837

8 Claims. (Cl. 315—166)

This invention relates to multicathode glow discharge devices and more particularly to such devices of the general type disclosed in M. A. Townsend Patent 2,575,370, granted November 20, 1951.

Devices of this general type, frequently referred to as stepping tubes, usually comprise two groups of cathodes mounted alternately and in cooperative relation to a single anode. Each of the cathodes is preferably constructed so as to comprise a preference mechanism to insure stepping of the discharge in only one direction on application of signal pulses to one group of cathodes. Such devices have application in electronic switching, computing, coding, and other electronic fields. They may be employed in circuits for coding and decoding or for translation of codes. Two common codes employed in computing and counting systems are the decimal and binary codes. Priorly, a number of stepping tubes have been employed for translation from a decimal to binary code, the number of tubes, number of cathodes required, and circuit interconnections becoming quite large and cumbersome if a large code, as a five-digit binary code, is to be translated.

One object of this invention is to simplify the translation of a decimal to a binary code. More specifically, it is an object of this invention to enable the translation of a decimal code to a three-digit binary code in a single discharge device and the translation to a larger binary code in a single discharge device or by a small group of such devices.

It is a further object of this invention to generate signals in time sequence for a binary code corresponding to any decimal number. As the signals of the binary code are in time sequence, they may appear on a single pair of leads rather than on a plurality of leads having a pair of leads for each digit in the binary code.

A still further object of this invention is to provide an improved stepping tube and improved circuits employing such tubes for the translation of a decimal to a binary code.

In one illustrative embodiment of this invention, a glow discharge device comprises a multitude of cathodes and a common anode cooperating with the cathode. The cathodes are arranged in rows in a branching or triangular array, and the first stage or row comprises a plurality of rest cathodes, which are generally referred to as A cathodes, each corresponding to a decimal code. Adjacent that stage is a row of transfer cathodes, which are generally referred to as B cathodes, one transfer cathode being adjacent each of the cathodes of the first stage. A second stage or row of rest cathodes is positioned adjacent the transfer cathodes, each rest cathode being cooperatively adjacent two transfer cathodes. A second row of transfer cathodes is adjacent the second row of rest cathodes, one transfer cathode being adjacent each rest cathode, and a third row of rest cathodes is adjacent the second row of transfer cathodes, each rest cathode being cooperatively adjacent two of the transfer cathodes, and so forth, until the last row of rest cathodes which may comprise just two rest cathodes.

The rest cathodes of each stage are alternatively connected to two output leads, and the transfer cathodes are all connected to a single lead. Adjacent each of the rest cathodes of the first stage is an auxiliary anode defining an auxiliary discharge gap. Except for the cathodes of this first row, each cathode advantageously comprises a preference mechanism.

A decimal code is applied to one of the auxiliary anodes causing a discharge in the auxiliary gap defined by that anode and one of the rest cathodes of the first stage. The stepping pulses applied to the transfer cathodes cause that discharge to step along the array of cathodes in a unique path. This path is defined by a series of rest cathodes in successive stages corresponding to the digits of the binary code equivalent to the applied decimal code.

In another illustrative embodiment of this invention, a plurality of such gaseous discharge devices are incorporated in a single circuit to translate larger codes.

It is one feature of this invention that the cathodes be arranged in a branching array and electrically grouped so that a discharge at one cathode of the first stage is stepped along a unique row of cathodes. In accordance with this feature of the invention, output connections are made to the cathodes so that the discharge in stepping along this unique row generates a binary code corresponding to the decimal code indicated by the cathode of the first stage.

It is a further feature of this invention that an auxiliary anode be positioned adjacent each cathode of the first stage of the array and define an auxiliary discharge gap thereby, each auxiliary anode corresponding to a decimal code. In accordance with this feature of the invention, a discharge is initiated between the auxiliary anode and cooperating cathode in response to a signal pulse applied to the auxiliary anode, which pulse corresponds to a decimal code. The discharge then transfers from the auxiliary anode to the main anode and is stopped along the cathode array to generate a binary code corresponding to the applied decimal code, in accordance with this invention.

In accordance with a still further feature of this invention, a plurality of gaseous discharge devices in accordance with this invention may be connected together in a single circuit to generate higher binary codes in response to higher applied decimal codes. More specifically, in accordance with this invention, four gaseous discharge devices each having three stages of rest cathodes in accordance with this invention may be interconnected to generate thirty-two five-digit codes of binary numbers.

The invention and these and other features thereof will be understood more clearly and fully from the following detailed description and the accompanying drawing, in which.

Figure 1:
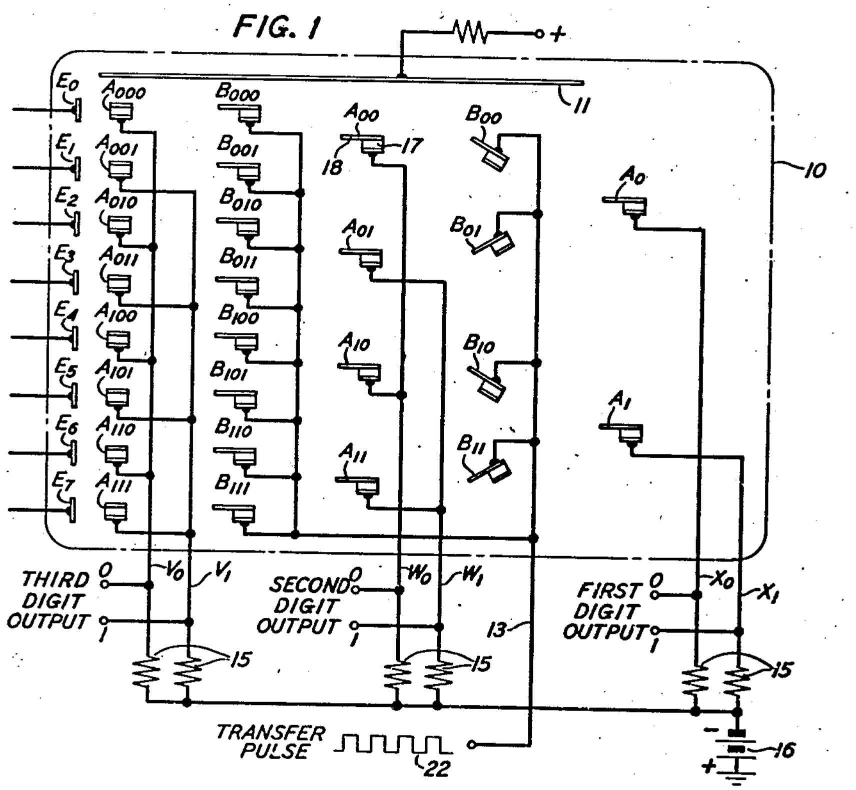
Fig. 1 is a diagrammatic representation of a gaseous discharge device illustrative of one specific embodiment of this invention.

Referring now to the drawing, the gaseous discharge device illustrative of one specific embodiment of this invention and shown in Fig. 1 comprises an envelope 10 having an ionizable atmosphere such as a rare gas or a mixture of rare gases therein, an anode 11 within that envelope, and a plurality of cathodes within the envelope and in cooperative relationship with the anode 11. The cathodes are arranged in a branching array and in alternate stages of rest or A and transfer or B cathodes. Specifically, the cathodes comprise a first stage of rest cathodes $A_{000}$, $A_{001}$, $A_{010}$, $A_{011}$, $A_{100}$, $A_{101}$, $A_{110}$, and $A_{111}$, a first row of transfer cathodes $B_{000}$, $B_{001}$, $B_{010}$, $B_{011}$, $B_{100}$, $B_{101}$, $B_{110}$, and $B_{111}$, a second stage of rest cathodes $A_{00}$, $A_{01}$, $A_{10}$, and $A_{11}$, a second row of transfer cathodes $B_{00}$, $B_{01}$, $B_{10}$, and $B_{11}$, and a third stage of rest cathodes $A_0$ and $A_1$. The transfer B cathodes are all connected to a common lead 13 extending through the envelope to which lead are applied to transfer or driving pulses from a pulse source, not shown. The B cathodes are adjacent and in stepping cooperation with the A cathode on the left having the same subscript and the A cathode on the right having the same subscript except for the last digit.

The rest or A cathodes of each stage are connected to two leads, the one lead for a "0" signal for the digit of the binary code at that stage and the other lead for a "1" signal for the digit of the binary code at that stage. The leads are $V_0$ and $V_1$ for the first stage, $W_0$ and $W_1$ for the second stage, and $X_0$ and $X_1$ for the third stage. The cathodes of each stage are connected to these output leads so that the subscript of the last digit of the A cathode is the same as the subscript of the lead. Each of these output leads is connected through an output resistance 15 to a grounded negative potential source 16. The output digits for the binary code may be taken off these resistances, the "0" or "1" output for the third digit being taken off the V leads attached to the first stage of A rest cathodes, the "0" or "1" output for the second digit being taken off the W leads attached to the second stage of A rest cathodes, and the "0" or "1" output for the first digit being taken off the X leads attached to the third stage of rest cathodes.

An auxiliary anode E is adjacent each A rest cathode of the first stage, the decimal subscript of each E auxiliary anode being the decimal equivalent of the binary subscript of the A rest cathode of the first stage to which it is adjacent and with which it defines an auxiliary gap.

Each of the cathodes of the device except the A cathodes of the first stage advantageously comprises a preference mechanism and may be of portions of two different discharge sustaining efficiencies. Thus, each such cathode may advantageously comprise a hollow portion 17 of high discharge sustaining efficiency and on extended or finger portion 18 of low discharge sustaining efficiency, as described in the above-cited Townsend patent.

Figure 2:
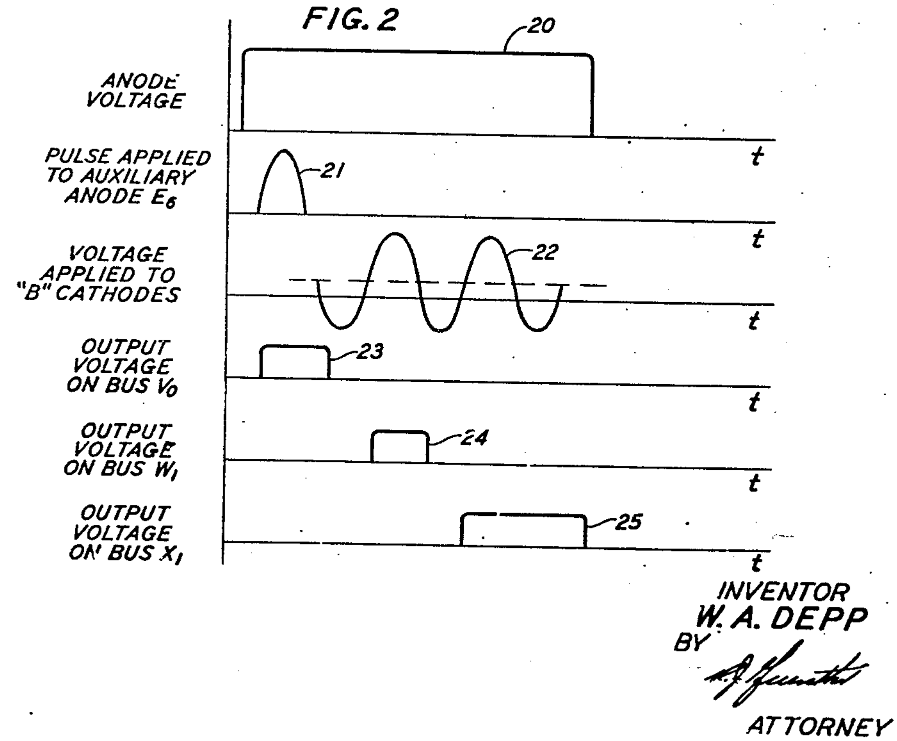
Fig. 2 is a graph of voltage as a function of time for the various voltages present in one translating operation of the embodiment of Fig. 1.

The operation of this embodiment of the invention can be easily understood by reference to an example of the translation of a decimal code to a binary code. Assume that it is desired to generate the binary code 110 corresponding to the decimal code or number 6. This might occur in a translating system where it is desired to generate teletypewriter signals corresponding to a given number or signal. The voltages of the device for this example are shown in Fig. 2. The main anode voltage 20 is or has been priorly applied to the main anode 11, but its amplitude is less than the breakdown voltage of the gaps between it and the A and B cathodes.

When a positive pulse 21, corresponding to an input decimal signal, is applied to the auxiliary anode $E_6$, the auxiliary gap defined by that anode and the associated rest cathode $A_{110}$ breaks down. This in turn causes a breakdown of the gap between the main anode 11 and rest cathode $A_{110}$, which causes current to flow through lead or bus $V_0$, and an output voltage 23 appears across the output resistance 15 of bus $V_0$. This indicates that the least significant, or third, digit of the desired binary code is 0. Transfer pulses 22 are applied to the transfer B cathodes and cause the discharge to step from cathode $A_{110}$ to cathode $B_{110}$ and to cathode $A_{11}$, the discharges between auxiliary anode $E_6$ and cathode $A_{110}$ and the main anode 11 and cathode $A_{110}$ being extinguished. When the discharge is present at cathode $A_{11}$, an output voltage 24 appears across the output resistance 15 in bus $W_1$, indicating that the middle digit of the desired binary code is 1. The further pulsing of the transfer B cathodes causes the discharge to step from cathode $A_{11}$ to cathode $B_{11}$ and to cathode $A_1$. This energizes bus $X_1$, causing an output signal 25 to appear, which indicates that the most significant or first digit of the desired binary number is 1.

Thus, the entire code 110 has been generated by stepping the discharge along the array of cathodes in accordance with this invention with the least significant digit appearing first in time sequence. Because of this time sequence, which is dependent on the frequency of the transfer pulses, all of the output signals could have appeared on a single pair of output leads rather than on the three pairs shown in Fig. 1. The digit of the code at each stage is determined by the last digit of the subscript of the A rest cathode at that stage.

Figure 3:
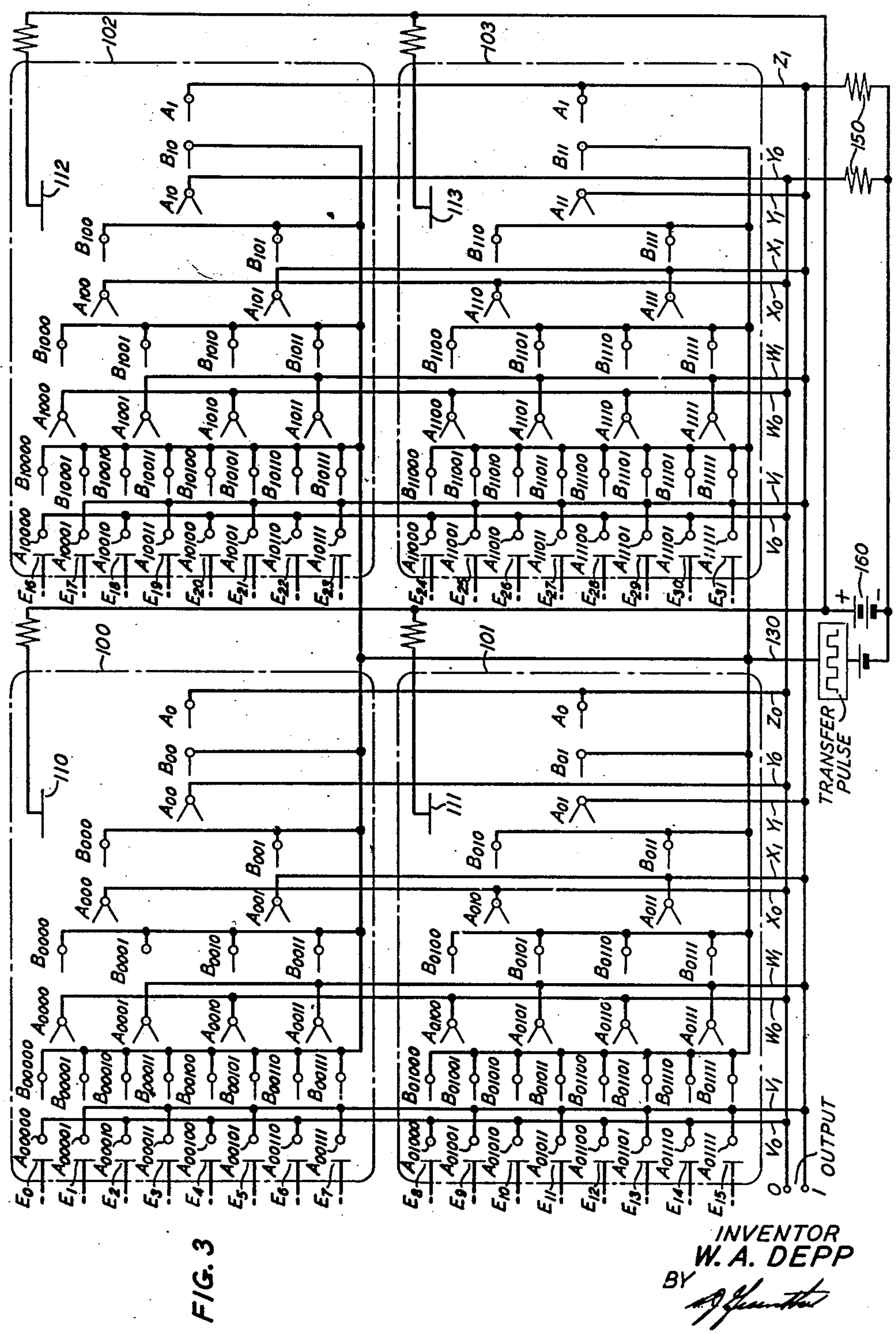
Fig. 3 is a schematic representation of a circuit incorporating the device of Fig. 1 and illustrative of one specific circuit embodiment of this invention.

Referring now to Fig. 3, four gaseous discharge devices in accordance with this invention are there shown connected together in accordance with another feature of this invention whereby thirty-two five-digit binary codes can be generated on application of a single pulse corresponding to a decimal number of from zero to thirty-one by having the discharge initiated on application of the decimal pulse stepped over a unique path. Each of the devices is similar and comprises an envelope 100, 101, 102, and 103, an anode 110, 111, 112, and 113, and a plurality of cathodes. The A cathodes of each stage are alternately connected by leads $V_0$, $V_1$ for the first stage, $W_0$, $W_1$ for the second stage, $X_0$, $X_1$ for the third stage, $Y_0$, $Y_1$ for the fourth stage, and $Z_0$, $Z_1$ for the last stage to a single pair of output terminals and to a single pair of output resistances 150. A source of potential 160 is connected between the resistances 150 and the anodes 110–113. All of the B transfer cathodes of the four devices are connected to a common lead 130 to which the transfer pulses are applied. The auxiliary electrodes $E_0$ to $E_{31}$ are each positioned adjacent the A rest cathode, having the binary subscript corresponding to the decimal subscript of the auxiliary anode.

It can be seen that, as in the embodiment of this invention shown in Fig. 1, the last digit of the subscript of the A rest cathodes determines the digit output of the binary code at that stage and that the least significant digit appears first in time sequence at the single pair of output terminals. Thus, if a binary number corresponding to the decimal number 13 is to be generated, a single pulse is applied to auxiliary anode $E_{13}$ causing a discharge between it and rest cathode $A_{01101}$. The unique path to be followed is determined by the initial rest cathode. The transfer pulses applied to lead 130 and to the transfer B cathodes will step the discharge along the path $A_{01101}$, $B_{01101}$, $A_{0110}$, $B_{0110}$, $A_{011}$, $B_{011}$, $A_{01}$, $B_{01}$, and $A_0$, a separate $A_0$ cathode being in each of the first two devices and a separate $A_1$ cathode in each of the second two devices.

The A and B cathodes are shown schematically in Fig. 3, it being understood that they may be advantageously of the general type illustrated for the embodiment of Fig. 1. Alternatively, certain of the A rest cathodes may have two portions of low discharge sustaining efficiency, as shown by the two lines extending from the main cathode body towards the two B transfer cathodes in the preceding row.

It is to be understood that the above-described arrangements are illustrative of the application of the principles of the invention. Numerous other arrangements may be devised by those skilled in the art without departing from the spirit and scope of the invention.

What is claimed is:

1. A gaseous discharge device comprising an anode, a plurality of cathodes cooperating with said anode and arranged in stages in a branching array, each stage having half the number of cathodes of the preceding stage, means for initiating a discharge between any one cathode of the first stage and said anode in response to a signal corresponding to a decimal number, means connecting alternate cathodes of each stage together, and means for stepping a discharge initiated between said one cathode of said first stage and said anode along a unique path of cathodes in said array to generate in time sequence output signals on said connecting means corresponding to the binary equivalent of the decimal code of the signal that initiated the discharge at the cathode of said first stage.

2. A gaseous discharge device comprising an anode, a plurality of cathodes cooperating with said anode and arranged in a branching array, said array comprising alternate stages of rest and transfer cathodes, each stage of rest cathodes having half the number of the preceding stage of rest cathodes, electrode means adjacent each rest cathode of the first stage and defining a distinct auxiliary gap therewith for initiating a discharge in said gap on application of a signal corresponding to a decimal code to said electrode means, lead means connecting alternate rest cathodes of each stage together, and means for applying transfer pulses to each of said transfer cathodes to step the discharge initiated by a decimal code signal at a given rest cathode of said first stage along a unique path of cathodes to generate in time sequence output signals on said lead means corresponding to the binary equivalent of the decimal code of said given rest cathode and adjacent electrode means.

3. A gaseous discharge device in accordance with claim 2 wherein each of said rest and transfer cathodes after said first stage of rest cathodes has a greater and a lesser discharge sustaining portion, the portion of lesser efficiency being adjacent the portion of greater efficiency of at least one cathode in the preceding stage in the array.

4. A gaseous discharge device comprising an anode, a plurality of cathodes cooperating with said anode and arranged in a branching array, said array comprising alternate stages of rest and transfer cathodes, each stage of rest cathodes having half the number of cathodes of the preceding stage of rest cathodes, means for initiating a discharge between one rest cathode of said first stage and said anode in response to a signal corresponding to a decimal code, lead means connecting alternate rest cathodes of each stage together, and means applying transfer pulses to said transfer cathodes to step the discharge from said one cathode of said first stage of rest cathodes along a unique path of cathodes in said array to generate output signals on said lead means in time sequence corresponding to the binary equivalent of the decimal code of said one cathode and said initiating means.

5. Translating means for generating a binary code in time sequence in response to an applied signal in a decimal code comprising a plurality of cathodes arranged in stages in a branching array, said array comprising alternate stages of rest and transfer cathodes, each stage of rest cathodes having half the number of cathodes of the preceding stage, an anode cooperating with each of said cathodes for sustaining a discharge therebetween, electrode means adjacent each rest cathode of the first stage and defining a distinct auxiliary gap therewith for initiating a discharge in said gap on application of a signal corresponding to a decimal code to said electrode means, lead means connecting alternate cathodes of each stage of rest cathodes together, and means for applying transfer pulses to each of said transfer cathodes to step the discharge initiated at a given rest cathode of said first stage along a unique path of cathodes in said array.

6. Translating means for generating a binary code in time sequence in response to an applied signal in a decimal code comprising a gaseous discharge device comprising an anode, a plurality of cathodes cooperating with said anode and arranged in a branching array, said array comprising alternate stages of rest and transfer cathodes, each stage of rest cathodes having half the number of cathodes of the preceding stage, an auxiliary anode adjacent each rest cathode of the first stage and cooperating therewith to initiate a discharge to a rest cathode of said first stage on application of a pulse corresponding to a decimal code to the auxiliary anode adjacent thereto, first lead means connecting alternate rest cathodes of each stage together, second lead means connecting said transfer cathodes together, and means applying transfer pulses to said second lead means to step a discharge initiated at a rest cathode of said first stage along a unique path of cathodes in said array.

7. Translating means in accordance with claim 6 wherein each of said rest and transfer cathodes after said first stage of rest cathodes has a greater and a lesser discharge efficiency portion, the portion of lesser efficiency being adjacent the portion of greater efficiency of at least one cathode in the preceding stage.

8. Translating means for generating a binary code in time sequence in response to an applied signal in a decimal code comprising a plurality of gaseous discharge devices, a plurality of cathodes arranged in stages in each of said devices in a branching array, said array comprising alternate stages of rest and transfer cathodes, lead means connecting alternate cathodes of each rest stage together, said means connecting corresponding stages in each of said devices, an anode in each of said devices, an auxiliary anode adjacent each rest cathode of the first stage in each of said devices for initiating a discharge to the adjacent rest cathode on application thereto of a signal corresponding to a decimal code, second lead means connecting all of said transfer cathodes of all of said devices together, and means for applying transfer pulses to said second lead means to step the discharge initiated at a given rest cathode of said first stage along a unique path of the cathodes in said branching array.

WALLACE A. DEPP.

References Cited in the file of this patent

UNITED STATES PATENTS

| Number | Name | Date |
|---|---|---|
| 2,575,370 | Townsend | Nov. 20, 1951 |